(12) United States Patent
Wu et al.

(10) Patent No.: US 12,159,083 B2
(45) Date of Patent: Dec. 3, 2024

(54) MULTIMEDIA SYSTEM

(71) Applicant: BENQ CORPORATION, Taipei (TW)

(72) Inventors: Chen-Chi Wu, Taipei (TW); Chia-Nan Shih, Taipei (TW); Chin-Fu Chiang, Taipei (TW); Jung-Kun Tseng, Taipei (TW); Chuang-Wei Wu, Taipei (TW); Chian Yu Yeh, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 18/170,547

(22) Filed: Feb. 17, 2023

(65) Prior Publication Data

US 2024/0053949 A1   Feb. 15, 2024

(30) Foreign Application Priority Data

Aug. 11, 2022  (TW) .................................. 111130160

(51) Int. Cl.
*G06F 15/177* (2006.01)
*G06F 3/16* (2006.01)
*H04L 67/01* (2022.01)

(52) U.S. Cl.
CPC .............. *G06F 3/165* (2013.01); *H04L 67/01* (2022.05)

(58) Field of Classification Search
None
See application file for complete search history.

(56) References Cited

U.S. PATENT DOCUMENTS

| | | | |
|---|---|---|---|
| 10,684,972 B2 | 6/2020 | Renard et al. | |
| 10,764,442 B1* | 9/2020 | Delaney | H04M 3/568 |
| 11,019,442 B2* | 5/2021 | Clark | H04R 29/004 |
| 2013/0321156 A1* | 12/2013 | Liu | H04M 1/724 |
| | | | 340/573.1 |
| 2015/0156598 A1* | 6/2015 | Sun | G10L 25/48 |
| | | | 348/14.07 |
| 2015/0195411 A1* | 7/2015 | Krack | H04M 3/569 |
| | | | 379/202.01 |
| 2017/0279862 A1 | 9/2017 | Bader-Natal et al. | |
| 2019/0200175 A1* | 6/2019 | Ylönen | H04B 1/401 |
| 2021/0058517 A1 | 2/2021 | Serbajlo et al. | |
| 2021/0409547 A1* | 12/2021 | Channapragada | H04M 3/568 |

(Continued)

FOREIGN PATENT DOCUMENTS

| | | |
|---|---|---|
| CN | 209982635 | 1/2020 |
| CN | 113132670 | 7/2021 |

(Continued)

OTHER PUBLICATIONS

"Search Report of Europe Counterpart Application", issued on Dec. 20, 2023, p. 1-p. 11.

(Continued)

*Primary Examiner* — Phuoc H Nguyen (57) ABSTRACT

A multimedia system is provided. The multimedia system includes a plurality of transmission devices and a receiving-end device. Multiple transmission devices respectively has a microphone. The receiving-end device is coupled to the transmission devices. When the microphone of one of the transmission devices is enabled, the receiving-end device outputs at least one control signal to at least another one of the transmission devices to disable the microphone of the at least another one of the transmission devices.

16 Claims, 5 Drawing Sheets

(56) References Cited

U.S. PATENT DOCUMENTS

2022/0413794 A1* 12/2022 Qiao .................. H04L 65/403
2023/0090613 A1*  3/2023 Covell ............... H04L 65/1093
                                                       709/204

FOREIGN PATENT DOCUMENTS

| GB | 2477156   | 7/2011  |
| TW | 201025013 | 7/2010  |
| TW | 201601145 | 1/2016  |
| TW | 202244914 | 11/2022 |

OTHER PUBLICATIONS

"Office Action of Taiwan Counterpart Application", issued on Aug. 7, 2023, p. 1-p. 6.

* cited by examiner

MULTIMEDIA SYSTEM

CROSS-REFERENCE TO RELATED APPLICATION

This application claims the priority benefit of Taiwan application serial no. 111130160, filed on Aug. 11, 2022. The entirety of the above-mentioned patent application is hereby incorporated by reference herein and made a part of this specification.

BACKGROUND

Technical Field

The disclosure relates to an audio-video streaming transmission technology, and in particular relates to a multimedia system.

Description of Related Art

The transmitting-end device (TX) of a general audio-video streaming transmission system is usually only used to provide a transmission interface to receive the audio-video stream provided by the audio-video providing device and to transmit the audio-video stream to the receiving-end device (RX). In addition, if a video conference is to be performed in a general audio-video streaming transmission system, the receiving-end device must include a microphone device or the electronic device coupled to the transmitting-end device must include a microphone device. Therefore, the microphone device may be too far away from the user, which is disadvantageous for sound collection, or if the electronic device does not have a built-in microphone device, the electronic device needs to externally connect an additional microphone device.

SUMMARY

The disclosure provides a multimedia system, which may be connected to a receiving-end device through multiple transmitting-end devices to realize a multi-person remote video conference.

The multimedia system of the disclosure includes multiple transmitting-end devices and a receiving-end device. Multiple transmission devices respectively has a microphone. The receiving-end device is coupled to the transmission devices. When the microphone of one of the transmission devices is enabled, the receiving-end device outputs at least one control signal to at least another one of the transmission devices to disable the microphone of the at least another one of the transmission devices.

In an embodiment of the disclosure, the one of the transmission devices is an audio device. The receiving-end device actively outputs the at least one control signal to the at least another one of the transmission devices, to disable the microphone of the at least another one of the transmission devices. The audio device is coupled to the receiving-end device through wired communication.

In an embodiment of the disclosure, the one of the transmission devices is a first transmitting-end device. The first transmitting-end device is coupled to the receiving-end device through wireless communication. The at least another one of the transmission devices is an audio device. The audio device is coupled to the receiving-end device through wired communication.

In an embodiment of the disclosure, the one of the transmission devices is a first transmitting-end device. The first transmitting-end device is coupled to the receiving-end device through wireless communication. The at least another one of the transmission devices is a second transmitting-end device. The second transmitting-end device is coupled to the receiving-end device through wireless communication.

In an embodiment of the disclosure, the microphone of the respective transmission devices are preset to operate in a silent mode, and when the at least one of the transmission devices detects a human voice, the microphone of at least one of the transmission devices is switched to operate in a non-silent mode.

In an embodiment of the disclosure, the microphone of the respective transmission devices are preset to operate in a non-silent mode. When the at least one of the transmission devices detects a human voice, the receiving-end device switches the microphone of the at least another one of transmission devices to operate in a silent mode.

In an embodiment of the disclosure, when the transmission devices first respectively provide multiple sound signals to the receiving-end device, the receiving-end device compares multiple volume levels of the sound signals or determines relative positions of each other to respectively decide to switch the microphone of the respective transmission devices to operate in a silent mode or a non-silent mode.

In an embodiment of the disclosure, the at least one of the transmission devices is a first transmitting-end device. The first transmitting-end device is coupled to the receiving-end device through wireless communication, and is coupled to a first audio-video providing device through wired communication. When the first audio-video providing device provides a first video signal to the first transmitting-end device, the microphone of the first transmitting-end device is enabled, and the first transmitting-end device provides the first video signal to the receiving-end device. The receiving-end device disables the microphone of the at least another one of the transmission devices.

In an embodiment of the disclosure, the microphone of the first transmitting-end device generates a first sound signal, and the first audio-video providing device further provides a second sound signal. The first transmitting-end device combines the first sound signal and the second sound signal to transmit a combined sound signal to the receiving-end device.

In an embodiment of the disclosure, the transmission devices respectively have a physical button. When the physical button of the at least one of the transmission devices is in a triggered state, the at least one of the transmission devices enables the microphone of the at least one of the transmission devices. When the physical button of the at least one of the transmission devices is in a non-triggered state, the at least one of the transmission devices disables the microphone of the at least one of the transmission devices.

In an embodiment of the disclosure, when the physical button of the at least another one of the transmission devices is in the triggered state, the at least another one of the transmission devices waits for the physical button of other transmission devices to be in a non-triggered state, then the microphone of the at least another one of the transmission devices is enabled afterward.

In an embodiment of the disclosure, when the microphone of the respective transmission devices are operated in a silent mode, the receiving-end device decides voting information according to a number of the respective physical buttons of the transmission devices in the triggered state.

In an embodiment of the disclosure, at least one of the transmission devices is a first transmitting-end device, and the first transmitting-end device is coupled to the receiving-end device through wireless communication, and is coupled to a first audio-video providing device through wired communication. When the first audio-video providing device determines that the first transmitting-end device has the microphone, the first audio-video providing device disables a built-in microphone and uses the microphone of the first transmitting-end device.

In an embodiment of the disclosure, the first transmitting-end device is coupled to the first audio-video providing device through an HDMI transmission line and a Type-C transmission line.

In an embodiment of the disclosure, the at least one of the transmission devices is a first transmitting-end device, and the first transmitting-end device is coupled to the receiving-end device through wireless communication, and is coupled to a first audio-video providing device through wired communication. When the first audio-video providing device executes a video conference software, a sound processing module of the first transmitting-end device receives at least one sound signal provided by other transmission device from the receiving-end device, and the sound processing module provides the at least one sound signal to the first audio-video providing device.

In an embodiment of the disclosure, the at least another one of the transmission devices is a second transmitting-end device, and the second transmitting-end device is coupled to the receiving-end device through wireless communication, and is coupled to a second audio-video providing device through wired communication. The second audio-video providing device provides the at least one sound signal to the second transmitting-end device, and the second transmitting-end device provides the at least one sound signal to the sound processing module of the first transmitting-end device through the receiving-end device.

In an embodiment of the disclosure, a built-in microphone of the first audio-video providing device is not disabled.

In an embodiment of the disclosure, when the receiving-end device executes a video conference software, the receiving-end device respectively registers the transmission devices as multiple virtual microphones, and the video conference software directly connects the virtual microphones.

In an embodiment of the disclosure, the receiving-end device includes a human-machine interface. The receiving-end device controls the at least one of the transmission devices according to an authority setting of the human-machine interface, and normally enables the microphone of the at least one of the transmission devices.

Based on the above, the multimedia system of the disclosure may determine that when the microphone of one of the transmission devices is enabled, the microphone of the other one of the transmission devices may be automatically disabled, so as to effectively reduce the occurrence of crosstalk interference.

In order to make the above-mentioned features and advantages of the disclosure comprehensible, embodiments accompanied with drawings are described in detail below.

DETAILED DESCRIPTION OF DISCLOSED EMBODIMENTS

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

Figure 1:
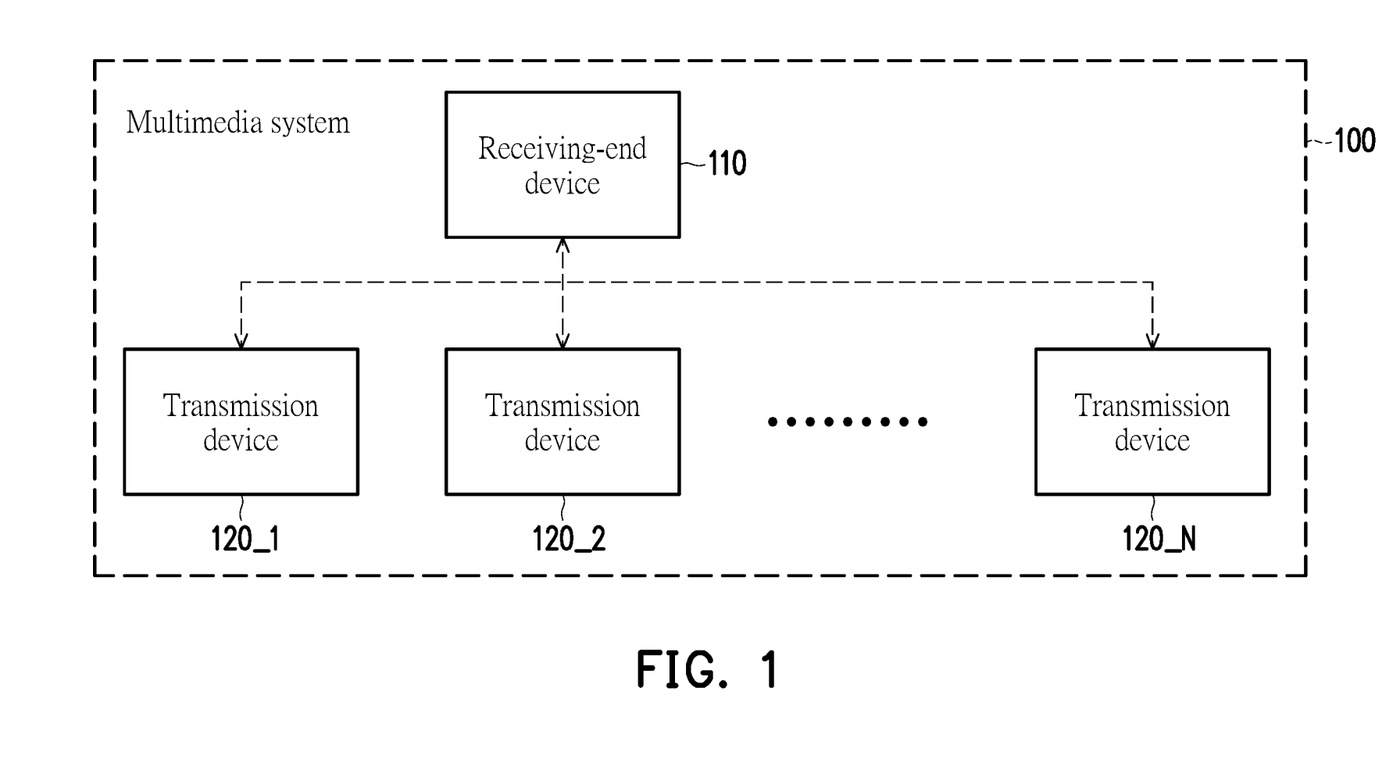
FIG. 1 is a circuit schematic diagram of a multimedia system according to an embodiment of the disclosure.

FIG. 1 is a circuit schematic diagram of a multimedia system according to an embodiment of the disclosure. Referring to FIG. 1, a multimedia system 100 includes a receiving-end device 110 (RX) and multiple transmission devices 120_1, 120_2 to 120_N, where N is a positive integer. The multimedia system 100 may be implemented as a conference system (or an online conference system or a video conference system), and the following embodiments are described by taking a conference as an example. The receiving-end device 110 may be coupled to the transmission devices 120_1, 120_2 to 120_N through wireless communication. The receiving-end device 110 may respectively receive multiple audio-video streaming data from the transmission devices 120_1, 120_2 to 120_N. In this embodiment, the transmission devices 120_1, 120_2 to 120_N may include multiple transmitting-end devices (TX), or include multiple transmitting-end devices and an audio device. The audio device may be, for example, a soundbox device. The transmitting-end devices may also be respectively coupled to multiple corresponding audio-video providing devices, and may receive audio-video streaming data provided by the audio-video providing devices to further provide the audio-video streaming data to the receiving-end device 110. The receiving-end device 110 may also send the integrated audio-video streaming data (e.g., conference audio-video data) combined from multiple audio-video streaming data received through the transmission devices 120_1, 120_2 to 120_N to at least one of the transmission devices 120_1, 120_2 to 120_N.

In other words, the receiving-end device 110 may implement a data hub to collect data of at least one audio-video streaming data and/or at least one sound signal generated by the user speaking, and broadcast and send the combined integrated audio-video streaming data and/or sound signals to the transmission devices 120_1, 120_2 to 120_N, to further provide the combined integrated audio-video streaming data and/or sound signals to the corresponding multiple audio-video providing devices through the transmission devices 120_1, 120_2 to 120_N, which is played back by the respective speakers and displays of the corresponding audio-video providing devices, to realize the conference function.

In this embodiment, the receiving-end device 110 may also be coupled to an audio-video device, such as a display, a projector, or a speaker, to provide conference audio-video data to the audio-video device, so that the audio-video device may play the conference audio-video data. Alternatively, the receiving-end device 110 provides the conference audio-video data to the conference platform (for example, the online conference platform or video conference platform set on the network server) through conference software (such as online conference software or video conference software) and the Internet, to conduct the conference. Alternatively, the receiving-end device 110 may provide the conference audio-video data to one of the transmission devices 120_1, 120_2 to 120_N, so that one of the transmission devices 120_1, 120_2 to 120_N may execute the conference software to realize the conference function. In addition, the conference software may be, for example, a "skype" video call software or a "zoom" video conference software, but the disclosure is not limited thereto.

In this embodiment, the transmission devices 120_1, 120_2 to 120_N may respectively have a microphone. When the microphone of one of the transmission devices 120_1, 120_2 to 120_N is enabled (i.e., for example, the microphone is operated in a non-silent mode), the receiving-end device 110 may output at least one control signal to at least another one of the transmission devices 120_1, 120_2 to 120_N to disable the microphone of the at least another one of the transmission devices 120_1, 120_2 to 120_N (i.e., for example, operate the microphone in a silent mode). A microphone may be used to receive sound provided by the user to generate sound signals. In other words, when a user operating one of the transmission devices 120_1, 120_2 to 120_N speaks, the receiving-end device 110 may disable the microphone of the at least another one of the transmission devices 120_1, 120_2 to 120_N, so as to prevent the microphone of the at least another one of the transmission devices 120_1, 120_2 to 120_N from receiving the sound emitted by the speakers coupled to one of the transmission devices 120_1, 120_2 to 120_N, thereby the crosstalk interference may be effectively reduced.

It is further exemplified that the crosstalk interference may, for example, refer to the fact that the microphone of the first transmission device and the microphone of the second transmission device are enabled at the same time, and the speaker coupled to the first transmission device and the speaker coupled to the second transmission device are enabled at the same time. The sound emitted from all the speakers play the sound of all the microphones synchronously, so the microphone of the second transmission device may receive sound from the speakers coupled to the first transmission device and form crosstalk. Therefore, the multimedia system 100 of this embodiment may automatically disable (i.e. turn off or operate in silent mode) the microphones of other transmission devices or the microphones of one or more nearby transmission devices when the microphone of the first transmission device is being used by the user (the user is speaking), to effectively reduce the occurrence of crosstalk interference.

Specifically, in one embodiment, the microphone of the respective transmission devices 120_1 and 120_2 to 120_N may be preset to operate in a silent mode. When the microphone of at least one of the transmission devices 120_1, 120_2 to 120_N detects a human voice, the microphone of at least one of the transmission devices 120_1, 120_2 to 120_N is switched to operate in a non-silent mode. In other words, the microphone of the respective transmission devices 120_1, 120_2 to 120_N may decide whether to automatically further provide the captured sound to the receiving-end device 110 (i.e., the microphone function is automatically turned on) according to whether a human voice is detected.

It is further exemplified that the silent mode may refer to that the sound signal generated by the sound detected by the current microphone is not provided to the receiving-end device 110, and the non-silent mode may refer to that that the sound signal generated by the sound detected by the current microphone may be provided to the receiving-end device 110. Alternatively, in one embodiment, the silent mode may also refer to that that the sound signal generated by the sound detected by the current microphone is provided to the receiving-end device 110, but the receiving-end device 110 does not further broadcast the sound signal to all the transmission devices 120_1, 120_2 to 120_N. The non-silent mode may also refer to that the sound signal generated by the sound detected by the current microphone may be provided to the receiving-end device 110, and the receiving-end device 110 further broadcasts the sound signal to all the transmission devices 120_1, 120_2 to 120_N.

Alternatively, in one embodiment, the microphone of the respective transmission devices 120_1 and 120_2 to 120_N may also be preset to operate in a non-silent mode. When the microphone of at least one of the transmission devices 120_1, 120_2 to 120_N detects a human voice, the microphone of at least one of the transmission devices 120_1, 120_2 to 120_N is switched to operate in a silent mode (i.e., the microphone function is automatically turned off). In other words, the microphone of the respective transmission devices 120_1, 120_2 to 120_N may decide whether to automatically disable the microphones of at least one other transmission device according to whether a human voice is detected, so as to effectively reduce crosstalk interference.

In one embodiment, when at least a portion of the transmission devices 120_1, 120_2 to 120_N first respectively provide multiple sound signals to the receiving-end device 110, the receiving-end device 110 may also compare the volume levels of the sound signals or determine the relative positions of each other to respectively decide to switch the microphone of the respective transmission devices 120_1, 120_2 to 120_N to operate in silent mode or non-silent mode. For example, the transmission devices 120_1, 120_2 to 120_N may respectively automatically determine whether sound is detected, and notify the receiving-end device 110. Then, the receiving-end device 110 may determine through algorithm calculation whether to operate the microphone of a certain transmission device for receiving the sound with the maximum volume in the non-silent mode, and operate the microphones of other transmission devices in the silent mode, so as to effectively reduce the crosstalk interference. Alternatively, the receiving-end device 110 may also operate the microphone of a certain transmission device for receiving the sound with the maximum volume in a non-silent mode, and operate the microphones of some other transmission devices that receive sound with lower volume (non-silent) in silent mode. The microphones of some other alternative transmission devices in which no sound is detected may operate in a non-silent mode or a silent mode. Even, the receiving-end device 110 may also determine the relative orientations and the relative distances of the transmission devices 120_1, 120_2 to 120_N to each other through algorithm calculation, thereby, for example, control the microphones of some transmission devices closest to the speaker to operate in the silent mode, so as to effectively reduce the occurrence of crosstalk interference.

In one embodiment, the transmission devices 120_1, 120_2 to 120_N may also respectively have a physical button. Taking the transmission device 120_1 as an example, when the physical button of the transmission device 120_1 is in a triggered state (e.g., the user presses the button), the transmission device 120_1 may enable its own microphone.

Conversely, when the physical button of the transmission device 120_1 is in a non-triggered state (e.g., the user does not press the button), the transmission device 120_1 may disable its own microphone.

In one embodiment, taking the transmission device 120_1 and the transmission device 120_2 as an example, when the physical button of the transmission device 120_2 is in a triggered state, the receiving-end device 110 may also first wait for other transmission devices (such as the transmission device 120_1 or other transmission devices), then the transmission device 120_2 is allowed to enable its own microphone afterwards. In this way, multiple microphones or adjacent microphones may be effectively prevented from being enabled at the same time and resulting in crosstalk interference.

In one embodiment, when the microphone of the respective transmission devices 120_1, 120_2 to 120_N are operated in the silent mode, the receiving-end device 110 may also decide the voting information according to the number of the respective physical buttons of the transmission devices 120_1, 120_2 to 120_N in the triggered state. In other words, the respective physical buttons of the transmission devices 120_1, 120_2 to 120_N may also be used for voting. For example, the receiving-end device 110 may determine the number of physical buttons in the transmission devices 120_1, 120_2 to 120_N that are in the trigger state, so as to decide the number of consenting votes, and the receiving-end device 110 may determine the number of physical buttons in the transmission devices 120_1, 120_2 to 120_N that are in the non-triggered state, so as to decide the number of dissenting votes.

In one embodiment, the receiving-end device 110 may further include a human-machine interface (HMI), and the receiving-end device 110 may control at least one of the transmission devices 120_1, 120_2 to 120_N according to an authority setting of the human-machine interface, to normally enable the microphone of at least one of the transmission devices 120_1, 120_2 to 120_N. In other words, the receiving-end device 110 may also decide whether to enable the microphone according to the authority level settings of the transmission devices 120_1, 120_2 to 120_N, respectively. For example, if the transmission device 120_2 is set by the user through the human-machine interface of the receiving-end device 110 and has the highest authority, and the transmission device 120_1 is set by the user through the human-machine interface of the receiving-end device 110 and has a lower authority, the microphone of the transmission device 120_2 may be continuously enabled, and the microphone of the transmission device 120_1 may be preset to be disabled until the microphone of the transmission device 120_1 detects a human voice.

Figure 2:
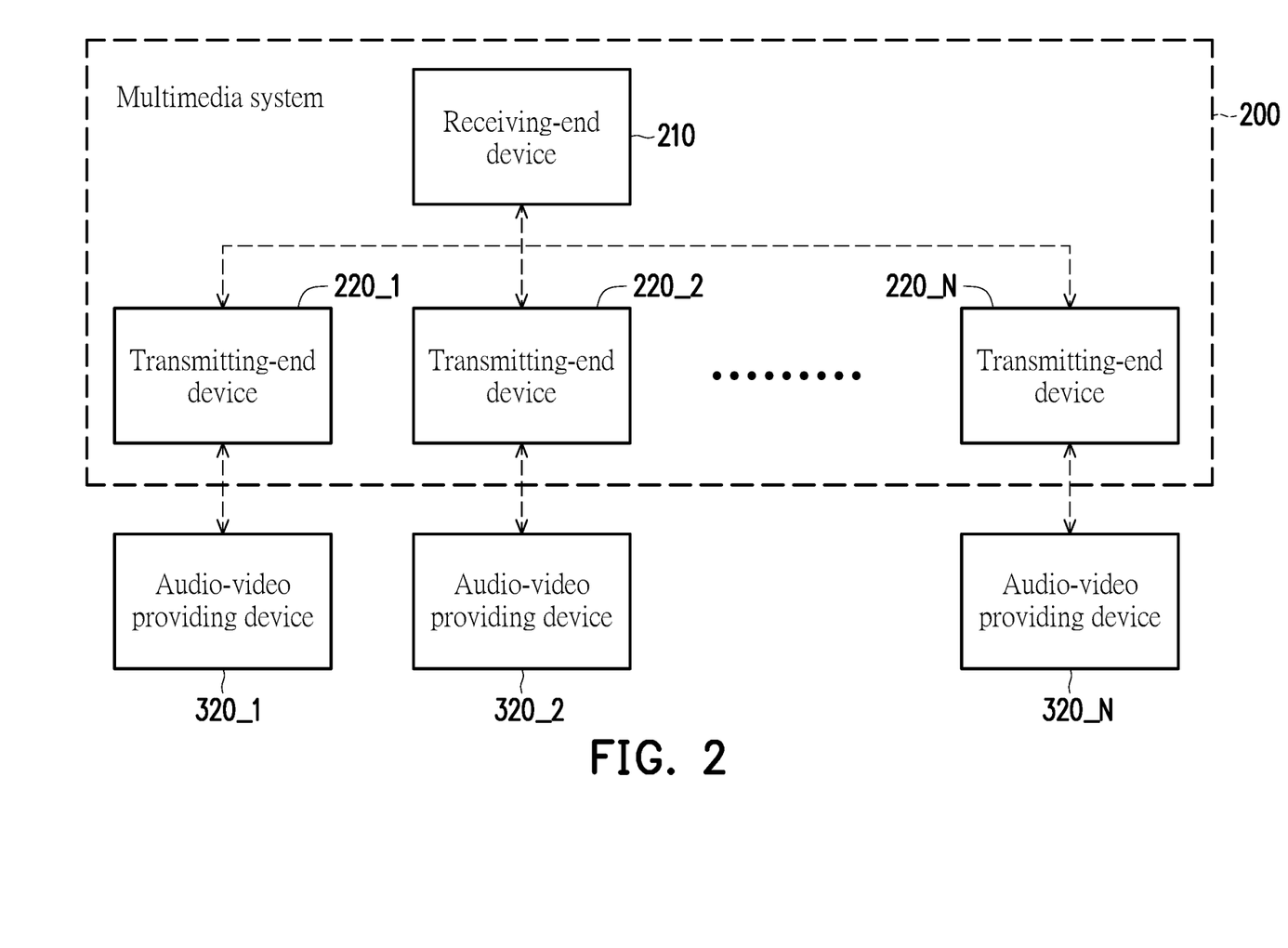
FIG. 2 is a circuit schematic diagram of a multimedia system according to another embodiment of the disclosure.

FIG. 2 is a circuit schematic diagram of a multimedia system according to another embodiment of the disclosure. Referring to FIG. 2, a multimedia system 200 includes a receiving-end device 210 and multiple transmitting-end devices 220_1, 220_2 to 220_N. The transmitting-end devices 220_1, 220_2 to 220_N may respectively have a microphone. The transmitting-end devices 220_1, 220_2 to 220_N are respectively coupled to the audio-video providing devices 320_1, 320_2 to 320_N through wired communication. In this embodiment, the audio-video providing devices 320_1, 320_2 to 320_N may respectively be a computer device equipped with a central processing unit (CPU) and/or a graphics processing unit (GPU), such as a laptop computer, a desktop computer, a tablet computer), etc. In one embodiment, the audio-video providing devices 320_1, 320_2 to 320_N may also respectively have a display, and have the capability of supporting multi-screen output, and may output video and audio data streaming.

In this embodiment, the transmitting-end devices 220_1, 220_2 to 220_N are respectively coupled to the audio-video providing devices 320_1, 320_2 to 320_N through wireless communication. For example, when the microphone of the transmitting-end device 220_1 is enabled, the receiving-end device 210 may output at least one control signal to at least another one of the transmitting-end devices 220_2 to 220_N to disable the microphone of the at least another one of the transmitting-end devices 220_2 to 220_N.

In one embodiment, the transmitting-end device 220_1 is taken as an example, in which the transmitting-end device 220_1 is coupled to the audio-video providing device 320_1 through wired communication. When the audio-video providing device 320_1 provides the video signal to the transmitting-end device 220_1, the microphone of the transmitting-end device 220_1 is enabled, and the transmitting-end device 220_1 provides the video signal to the receiving-end device 210. The receiving-end device 210 also disables the microphone of at least another one of the transmitting-end devices 220_2 to 220_N. It should be noted that the video signal may be, for example, a shared screen (such as an operating system (OS) screen or a video screen generated by playing a video file) or video data of a video screen (the transmitting-end may also include, for example, a camera, to generate a video screen of people). In other words, the microphone of the transmitting-end device 220_1 may cooperate with the audio-video providing device 320_1 to provide the video signal and the sound signal to the receiving-end device 210 synchronously. In addition, the receiving-end device 210 may first detect whether the transmitting-end device 220_1 has a microphone, and detect whether the audio-video providing device 320_1 has a microphone. When the audio-video providing device 320_1 has a microphone, the receiving-end device 210 may actively notify the audio-video providing device 320_1 to disable the microphone of the audio-video providing device 320_1. In other words, the microphone of the transmitting-end device 220_1 may replace the microphone of the audio-video providing device 320_1 to provide the sound signal. In one embodiment, when the audio-video providing device 320_1 has a microphone, the receiving-end device 210 may also actively notify the transmitting-end device 220_1 to disable the microphone of the transmitting-end device 220_1. In other words, the microphone of the audio-video providing device 320_1 may be preferentially used to provide the sound signal.

In one embodiment, when the microphone of the transmitting-end device 220_1 generates the first sound signal, and when the audio-video providing device 320_1 generates a video screen and a second sound signal (i.e., audio corresponding to the video screen) due to playing the video file, the audio-video providing device 320_1 may provide the video screen and the second sound signal to the transmitting-end device 220_1. At this time, the transmitting-end device 220_1 may also combine the first sound signal and the second sound signal to transmit the combined sound signal to the receiving-end device 210. In other words, the user operating the audio-video providing device 320_1 may play the video screen with audio at the same time and speak at the same time.

Figure 3:
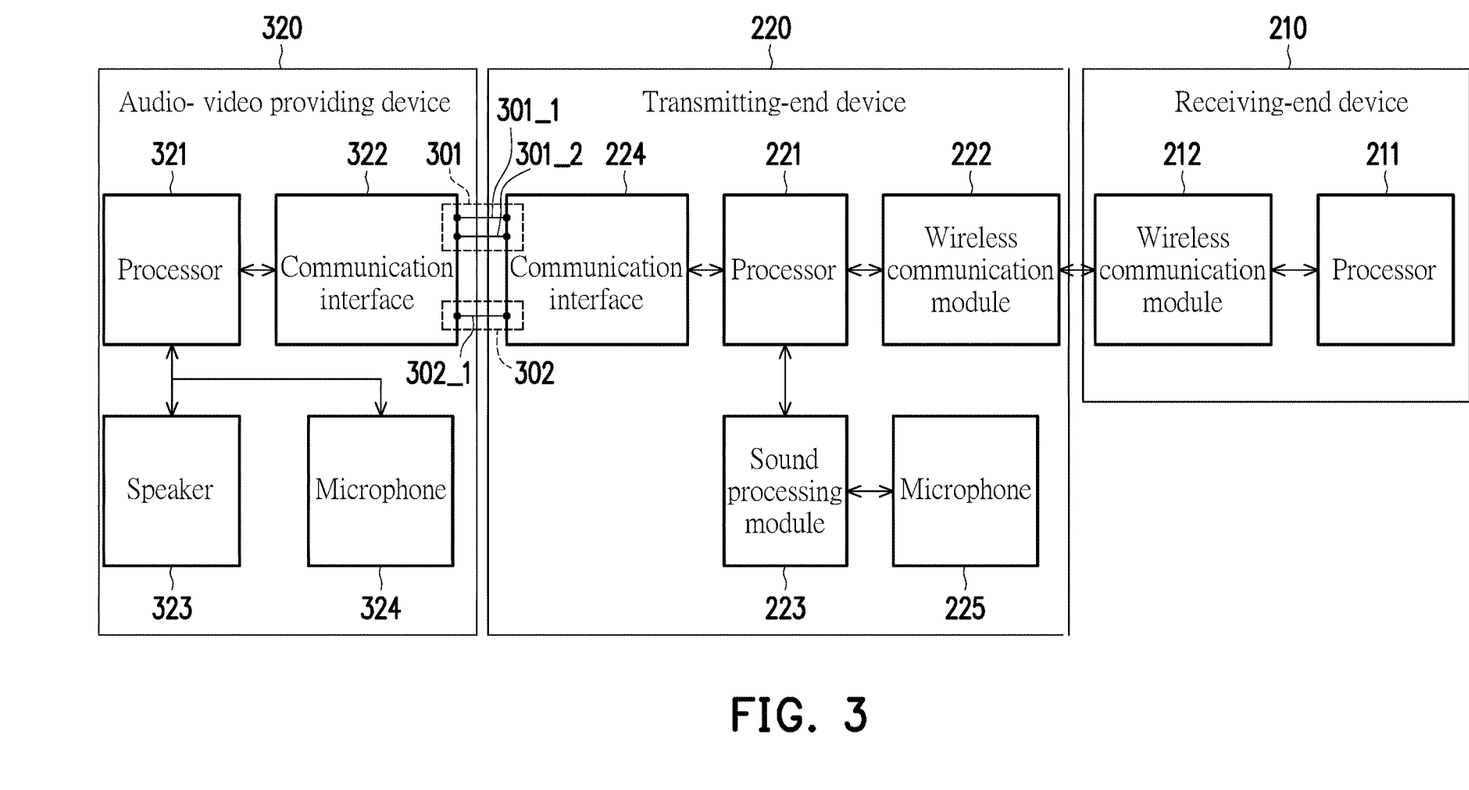
FIG. 3 is a circuit schematic diagram of the audio-video providing device, the transmitting-end device, and the receiving-end device according to the embodiment of FIG. 2 of the disclosure.

FIG. 3 is a circuit schematic diagram of the audio-video providing device, the transmitting-end device, and the receiving-end device according to the embodiment of FIG. 2 of the disclosure. The following embodiments take the transmitting-end device 220_1 and the audio-video providing device 320_1 as examples, and the analogy may be applied to the transmitting-end devices 220_1 to 220_N and the audio-video providing devices 320_1 to 320_N. In this embodiment, the receiving-end device 210 includes a processor 211 and a wireless communication module 212. The processor 211 is coupled to the wireless communication module 212. The transmitting-end device 220 includes a processor 221, a wireless communication module 222, a sound processing module 223, a communication interface 224, and a microphone 225. The processor 221 is coupled to the wireless communication module 222, the sound processing module 223, and the communication interface 224. The sound processing module 223 is coupled to the microphone 225. The audio-video providing device 320 includes a processor 321, a communication interface 322, a speaker 323 and a microphone 324. The processor 321 is coupled to the communication interface 322, the speaker 323, and the microphone 324.

In this embodiment, the transmitting-end device 220 is coupled to the wireless communication module 212 of the receiving-end device 210 through wireless communication through the wireless communication module 222. In this embodiment, the wireless communication module 212 and the wireless communication module 222 may respectively include, for example, a related communication circuit of a WiFi wireless communication interface or a Bluetooth wireless communication interface, but the disclosure is not limited thereto. In this embodiment, the communication interface 224 of the transmitting-end device 220 is coupled to the communication interface 322 of the audio-video providing device 320 through wired communication. The communication interface 224 of the transmitting-end device 220 may be coupled to the communication interface 322 of the audio-video providing device 320 through the Type-C transmission line 301 and the HDMI (high definition multimedia interface) transmission line 302. The Type-C transmission line 301 may include an audio-video streaming channel 301_1 and a power channel 301_2. The HDMI transmission line 302 may include an audio-video streaming channel 302_1. The communication interface 224 and the communication interface 322 may respectively include a Type-C interface, an HDMI interface, and related communication circuits for coupling the Type-C transmission line 301 and the HDMI transmission line 302.

In this embodiment, when the transmitting-end device 220 is coupled to the audio-video providing device 320 through the Type-C transmission line 301 and the HDMI transmission line 302 at the same time, the communication interface 224 of the transmitting-end device 220 receives the audio-video streaming data provided by the audio-video providing device 320 through the audio-video streaming channel 302_1 of the HDMI transmission line 302. In this embodiment, the processor 221 of the transmitting-end device 220 preferentially selects the audio-video streaming channel 302_1 of the HDMI transmission line 302 to receive the audio-video streaming data provided by the audio-video providing device 320, and the processor 221 of the transmitting-end device 220 transmits the audio-video streaming data to the receiving-end device 210 through the wireless communication module 222. In other words, when the transmitting-end device 220 is coupled to the audio-video providing device 320 through the Type-C transmission line 301 and the HDMI transmission line 302 at the same time, the transmitting-end device 220 preferentially uses the audio-video streaming data transmitted by the HDMI transmission line 302. In one embodiment, the communication interface 224 of the transmitting-end device 220 may also be coupled to the communication interface 322 of the audio-video providing device 320 only through the Type-C transmission line 301, and the processor 221 of the transmitting-end device 220 receives the audio-video streaming data provided by the audio-video providing device 320 by using the audio-video streaming channel 301_1 of the Type-C transmission line 301.

In this embodiment, the transmitting-end device 220 also turns on the power channel 301_2 of the Type-C transmission line 301 through the communication interface 224, so that the communication interface 224 obtains the power signal from the audio-video providing device 320 through the power channel 301_2 and provides the power signal to the transmitting-end device 220, so that the transmitting-end device 220 may obtain power through the Type-C transmission line 301. The power module of the transmitting-end device 220 may include a related power circuit, and may provide the power required for driving (or enabling) the operation of the transmitting-end device 220. In other words, in this embodiment, when the transmitting-end device 220 is coupled to the audio-video providing device 320 through the Type-C transmission line 301 and the HDMI transmission line 302 at the same time, the transmitting-end device 220 preferentially uses the HDMI transmission line 302 to transmit the audio-video streaming data, and the Type-C transmission line 301 is maintained to receive the power signal provided by the audio-video providing device 320.

In this embodiment, the processors 211 and 221 may respectively be, for example, a system on a chip (SOC), and the processor 321 may include, for example, a central processing unit (CPU) or other programmable general-purpose or special-purpose microprocessor, a digital signal processor (DSP), a programmable controller, an application specific integrated circuit (ASIC), a programmable logic device (PLD), or other similar processing devices or a combination of these devices.

In this embodiment, the transmitting-end device 220 may further include a storage unit, the storage unit may be, for example, dynamic random access memory (DRAM), flash memory, or non-volatile random access memory (NVRAM), etc. The receiving-end device 210 may also include a storage unit, and the receiving-end device 210 may also be coupled with the display module in a wired or wireless manner to exchange extended display identification data (EDID) with the display module, to provide the audio-video streaming data (or the aforementioned conference audio-video data) to the display module for display.

In this embodiment, the processor 221 of the transmitting-end device 220 may generate (establish) multiple virtual extended display identification data, which are stored in the storage unit. The processor 221 of the transmitting-end device 220 may provide the virtual extended display identification data to the audio-video providing device 320 through the Type-C transmission line 301 and/or the HDMI transmission line 302. The audio-video providing device 320 may automatically identify multiple virtual displays coupled thereto according to the received virtual extended display identification data, so that the audio-video providing device 320 may output one or more audio-video streams through the HDMI transmission line 302. The virtual extended display identification data may have the same setting data or different setting data.

In this embodiment, when the processor 321 of the audio-video providing device 320 determines that the transmitting-end device 220 has the microphone 225, the audio-video providing device 320 may disable the built-in microphone 324 and use the microphone 225 of the transmitting-end device 220 for sound reception. In addition, the processor 221 of the transmitting-end device 220 may provide the sound signal to the wireless communication module 212 of the receiving-end device 210 through the wireless communication module 222, so that the processor 211 of the receiving-end device 210 may provide the sound signal to the transmitting-end device 220 and other transmitting-end devices through the communication interface 413. In this regard, the processor 221 of the transmitting-end device 220 may further provide the sound signal to the speaker 323 of the audio-video providing device 320 for playback, and the speakers of the audio-video providing devices coupled to other transmitting-end devices may also play the sound signal. Therefore, in order to reduce the occurrence of crosstalk interference, the receiving-end device 210 of this embodiment may disable the microphones of other transmitting-end devices.

In one embodiment, the video conference software may, for example, be installed in the audio-video providing device 320. When the processor 321 of the audio-video providing device 320 executes the video conference software, the sound processing module 223 of the transmitting-end device 220 may receive at least one sound signal provided by the other transmitting-end devices or the microphone 225 from the receiving-end device 210, and the sound processing module 223 may provide the at least one sound signal to the audio-video providing device 320. For example, assuming that the receiving-end device 210 may also be coupled to another transmitting-end device, when the microphone of the another transmitting-end device is enabled, the receiving-end device 210 may first disable the microphone 225 of the transmitting-end device 220, or even disable the microphones of other transmitting-end devices to effectively avoid crosstalk interference. The sound processing module 223 of the transmitting-end device 220 may receive the sound signal provided by the microphone of the another transmitting-end device from the receiving-end device 210, and provide the sound signal to the audio-video providing device 320. In other words, for the transmitting-end device 220, the transmitting-end device 220 does not know the source of the sound, but only knows that the sound signal is received from the receiving-end device 210. Also, in one embodiment, the microphone 324 of the audio-video providing device 320 is not disabled. In this way, the user who operates the audio-video providing device 320 may speak through the microphone 324 of the audio-video providing device 320.

In another embodiment, the video conference software may also, for example, be installed in the receiving-end device 210. When the receiving-end device 210 executes the video conference software, the receiving-end device 210 may respectively register the transmitting-end device 220 and other transmitting-end devices also coupled to the receiving-end device 210 as virtual microphones, and the video conference software executed by the receiving-end device 210 is directly connects these virtual microphones. For example, when the microphone 225 of the transmitting-end device 220 is enabled, the receiving-end device 210 may disable the microphones of other transmitting-end devices to effectively avoid crosstalk interference. At this time, the video conference software executed by the receiving-end device 210 may register the microphone 225 of the transmitting-end device 220 as a virtual microphone, and the microphone 324 of the audio-video providing device 320 is disabled. In this way, the user operating the audio-video providing device 320 may speak through the microphone 225 of the transmitting-end device 220, so that the receiving-end device 210 provides the sound signal to the video conference software executed by the processor 211.

It should be noted that the aforementioned registration of multiple transmitting-end devices as multiple virtual microphones refers to that the video conference software executed by the receiving-end device 210 may respectively set the multiple transmitting-end devices coupled to the receiving-end device 210 as (or regarded as) multiple sound sources (i.e., regarded as multiple external microphone devices), to receive the sound signals provided by these transmitting-end devices. In other words, these transmitting-end devices may further provide the sound signals provided by the respective microphones or the respectively coupled audio-video providing devices to the receiving-end device 210. Moreover, the registration may refer to that the video conference software identifies these transmitting-end devices as multiple external microphone devices, and for example, changes the hardware registration ID of these transmitting-end devices to the hardware registration ID of the virtual microphone corresponding to the video conference software. From another point of view, regardless of the source of the sound signals of these transmission-end devices (may be from the microphone of the transmitting-end device or the audio-video streaming data provided by the audio-video providing device), the receiving-end device 210 may directly regard these transmitting-end devices as virtual microphones that may provide sound signals.

Figure 4:
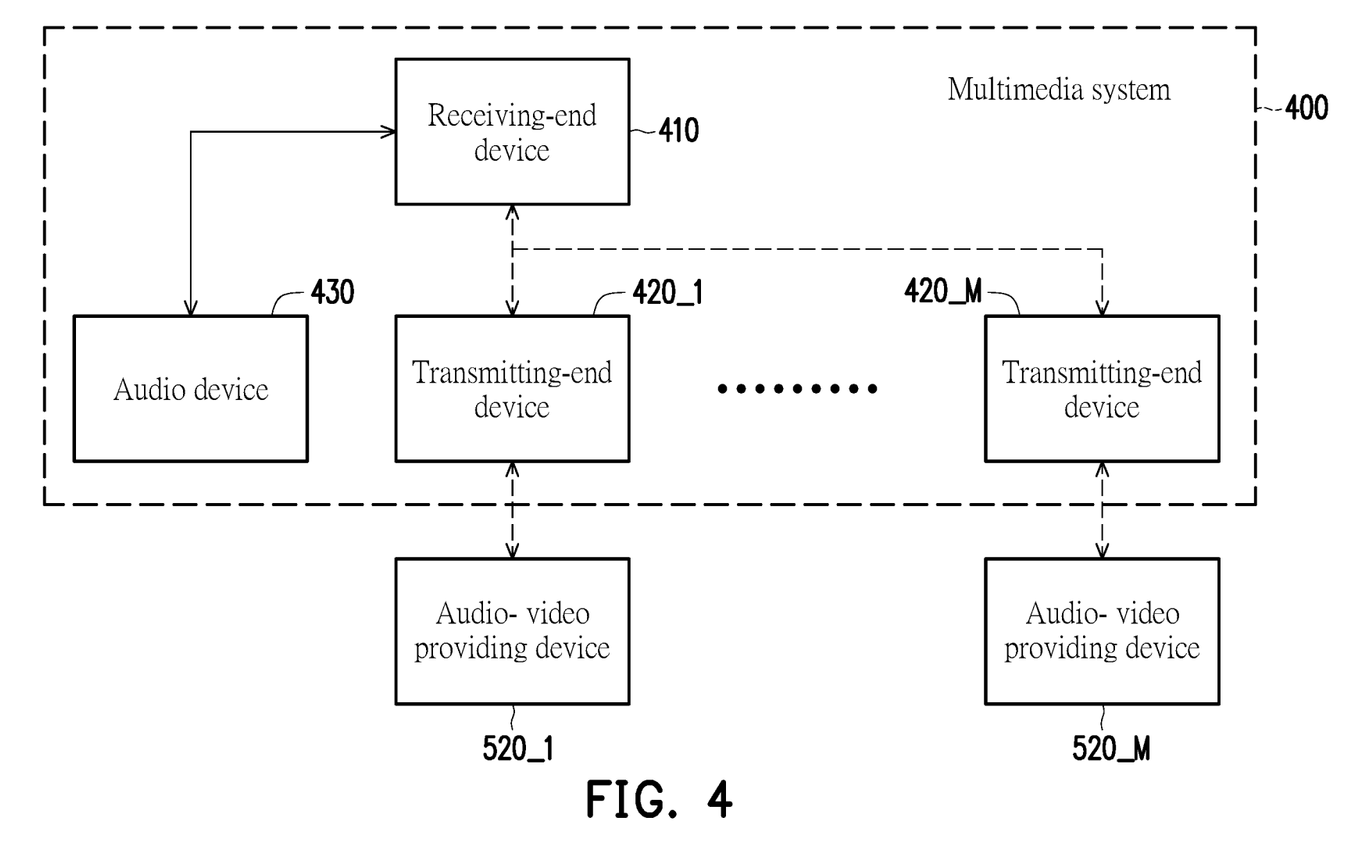
FIG. 4 is a circuit schematic diagram of a multimedia system according to another embodiment of the disclosure.

FIG. 4 is a circuit schematic diagram of a multimedia system according to another embodiment of the disclosure. Referring to FIG. 4, the multimedia system 400 includes a receiving-end device 410, multiple transmitting-end devices 420_1 to 420_M, and an audio device 430, in which M is a positive integer. The transmitting-end devices 420_1 to 420_M may respectively have a microphone. The audio device 430 may be a soundbox device with a microphone and a speaker. Moreover, in one embodiment, the audio device 430 may also be operated by a certain user. In one embodiment, the multimedia system 400 may be coupled to multiple audio devices, which is not limited to that shown in FIG. 4. The transmitting-end devices 420_1 to 420_M are respectively coupled to the audio-video providing devices 520_1 to 520_M through wired communication. The transmitting-end devices 420_1 to 420_M are coupled to the receiving-end device 410 through wireless communication. The audio device 430 is coupled to the receiving-end device 410 through wired communication. However, in one embodiment, the audio device 430 may also be coupled to the receiving-end device 410 through wireless communication.

In this embodiment, when the receiving-end device 410 determines that the microphone of the audio device 430 is enabled, the receiving-end device 410 may actively output at least one control signal to at least one of the transmitting-end devices 420_1 to 420_M to disable the microphone of at least one of the transmitting-end devices 420_1 to 420_M. In one embodiment, when the receiving-end device 410 determines that it is coupled to the audio device 430, the receiving-end device 410 may also be preset to pre-enable the microphone of the audio device 430 and pre-disable the microphone of at least one of the transmitting-end devices 420_1 to 420_M. In one embodiment, when the receiving-end device 410 determines that the microphone of one of the transmitting-end devices 420_1 to 420_M is enabled, the receiving-end device 410 may actively output at least one control signal to at least one of the audio device 430 and other transmitting-end devices to disable at least one of the microphones of the audio device 430 and other transmitting-end devices. In other words, when a user operating one of the transmitting-end devices 420_1 to 420_M and the audio device 430 speaks, the receiving-end device 410 may disable the microphones of the others and/or the audio device 430 to effectively reduce crosstalk interference.

In addition, for the specific implementation circuits and specific implementations of the receiving-end device 410, the transmitting-end devices 420_1 to 420_M, and the audio-video providing devices 520_1 to 520_M in this embodiment, reference may be made to the receiving-end device 210, the transmitting-end device 220 and the audio-video providing device 320 in the aforementioned embodiment of FIG. 3, and details are not repeated herein.

Figure 5:
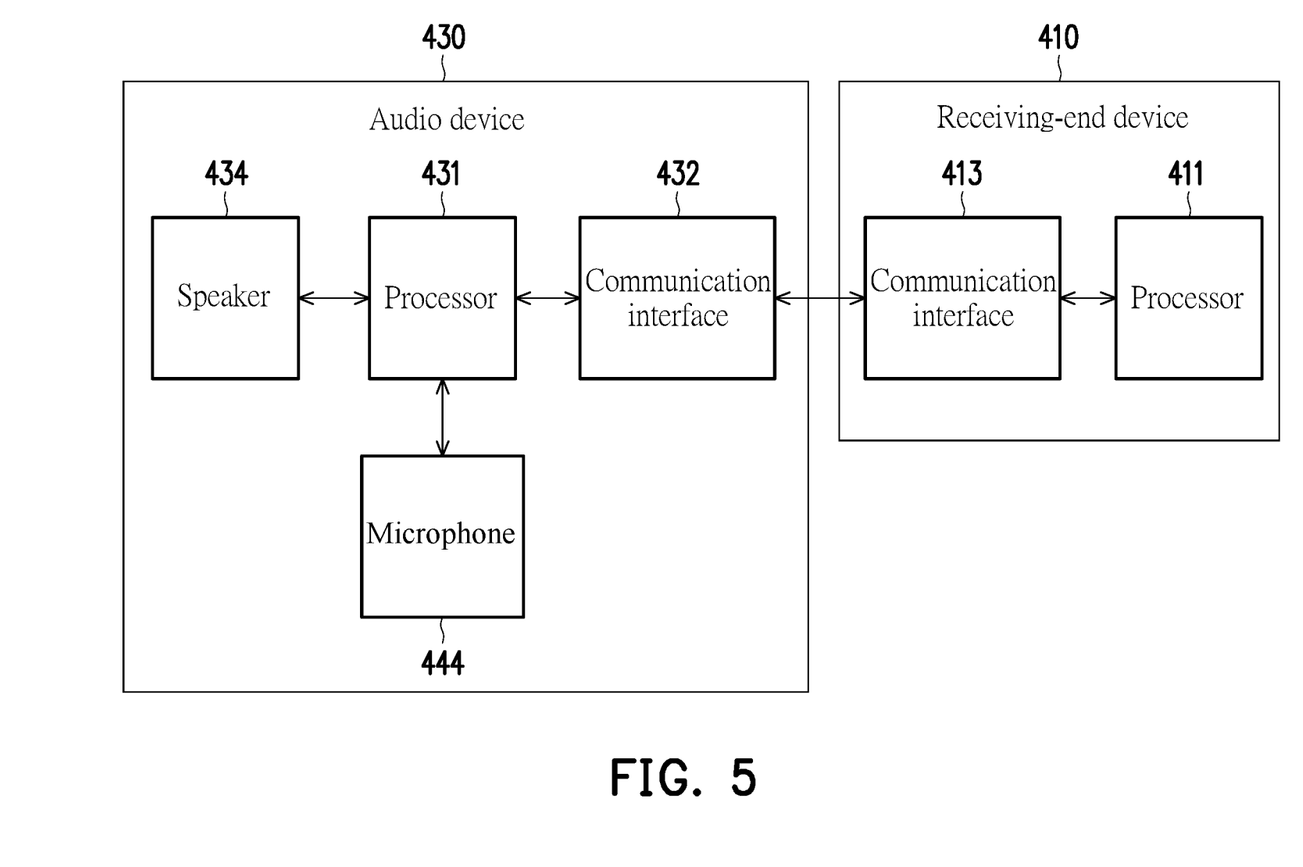
FIG. 5 is a circuit schematic diagram of the audio-video providing device, the transmitting-end device, and the receiving-end device according to the embodiment of FIG. 4 of the disclosure.

FIG. 5 is a circuit schematic diagram of the audio-video providing device, the transmitting-end device, and the receiving-end device according to the embodiment of FIG. 4 of the disclosure. The following embodiments take the audio device 430 as an example. In this embodiment, the receiving-end device 410 includes a processor 411 and a communication interface 413. The processor 411 is coupled to the communication interface 413. The receiving-end device 410 may further include the wireless communication module 212 of the receiving-end device 210 in FIG. 2. The audio device 430 includes a processor 431, a communication interface 432, a speaker 434, and a microphone 444. The processor 431 is coupled to the communication interface 432, the speaker 434, and the microphone 444.

In this embodiment, the communication interface 432 of the audio device 430 is coupled to the communication interface 413 of the receiving-end device 410 through wired communication. The communication interface 432 may be coupled to the communication interface 413 of the receiving-end device 410 through a Type-C transmission line, an HDMI transmission line, or other types of transmission lines. In this embodiment, when the microphone 444 of the audio device 430 is enabled, the processor 431 of the audio device 430 may provide the sound signal to the communication interface 413 of the receiving-end device 410 through the communication interface 432, so that the processor 411 of the receiving-end device 410 may provide the sound signal to the audio device 430 and other transmitting-end devices through the communication interface 413. In this regard, the processor 431 of the audio device 430 may provide the sound signal to the speaker 434 for playback, and the speakers of the audio-video providing devices coupled to other transmitting-end devices may also play the sound signal. Therefore, in order to reduce the occurrence of crosstalk interference, the receiving-end device 210 of this embodiment may disable the microphones of other transmitting-end devices. In addition, if the microphones of other transmitting-end devices are enabled, the receiving-end device 210 may similarly disable the microphone 444 of the audio device 430 to reduce the occurrence of crosstalk interference.

To sum up, the multimedia system of the disclosure may realize a conference system that may be used by many people, and may provide a sound reception function through the microphone of the transmitting-end device, so as to provide a better sound reception function. The multimedia system of the disclosure may automatically detect the microphone of the main speaker, so as to correspondingly disable all or a portion of the microphones of other transmitting-end devices, so as to effectively reduce the occurrence of crosstalk interference. In addition, the multimedia system of the disclosure may also be used with conference software.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A multimedia system, comprising:
a plurality of transmitting-end devices, respectively having a microphone; and
a receiving-end device, coupled to the transmission devices,
wherein when the microphone of one of the transmission devices is enabled, the receiving-end device outputs at least one control signal to at least another one of the transmission devices to disable the microphone of the at least another one of the transmission devices,
wherein when the transmission devices first respectively provide a plurality of sound signals to the receiving-end device, the receiving-end device compares a plurality of volume levels of the sound signals to respectively decide to switch the microphone of the respective transmission devices to operate in a silent mode or a non-silent mode,
wherein the receiving-end device is configured to switch a microphone of the transmission device corresponding to the sound signal with a maximum volume level to operate in a non-silent mode, and microphones of the transmission devices corresponding to lower level sound signals to operate in a silent mode.

2. The multimedia system according to claim 1, wherein the one of the transmission devices is an audio device, and the receiving-end device actively outputs the at least one control signal to the at least another one of the transmission devices, to disable the microphone of the at least another one of the transmission devices,
wherein the audio device is coupled to the receiving-end device through wired communication.

3. The multimedia system according to claim 1, wherein the one of the transmission devices is a first transmitting-end device, and the first transmitting-end device is coupled to the receiving-end device through wireless communication,
wherein the at least another one of the transmission devices is an audio device, and the audio device is coupled to the receiving-end device through wired communication.

4. The multimedia system according to claim 1, wherein the one of the transmission devices is a first transmitting-end device, and the first transmitting-end device is coupled to the receiving-end device through wireless communication,
wherein the at least another one of the transmission devices is a second transmitting-end device, and the second transmitting-end device is coupled to the receiving-end device through wireless communication.

5. The multimedia system according to claim 1, wherein the microphone of the respective transmission devices are preset to operate in a silent mode, when the at least one of the transmission devices detects a human voice, the microphone of at least one of the transmission devices is switched to operate in a non-silent mode.

6. The multimedia system according to claim 1, wherein the microphone of the respective transmission devices are preset to operate in a non-silent mode, when the at least one of the transmission devices detects a human voice, the receiving-end device switches the microphone of the at least another one of transmission devices to operate in a silent mode.

7. The multimedia system according to claim 1, wherein the transmission devices respectively have a physical button,
   wherein when the physical button of the at least one of the transmission devices is in a triggered state, the at least one of the transmission devices enables the microphone of the at least one of the transmission devices,
   wherein when the physical button of the at least one of the transmission devices is in a non-triggered state, the at least one of the transmission devices disables the microphone of the at least one of the transmission devices.

8. The multimedia system according to claim 7, wherein when the physical button of the at least another one of the transmission devices is in the triggered state, the at least another one of the transmission devices waits for the physical button of other transmission devices to be in a non-triggered state, then the microphone of the at least another one of the transmission devices is enabled afterward.

9. The multimedia system according to claim 7, wherein when the microphone of the respective transmission devices are operated in a silent mode, the receiving-end device decides voting information according to a number of the respective physical buttons of the transmission devices in the triggered state.

10. The multimedia system according to claim 1, wherein the at least one of the transmission devices is a first transmitting-end device, and the first transmitting-end device is coupled to the receiving-end device through wireless communication, and is coupled to a first audio-video providing device through wired communication,
   wherein when the first audio-video providing device determines that the first transmitting-end device has the microphone, the first audio-video providing device disables a built-in microphone and uses the microphone of the first transmitting-end device.

11. The multimedia system according to claim 10, wherein the first transmitting-end device is coupled to the first audio-video providing device through an HDMI transmission line and a Type-C transmission line.

12. The multimedia system according to claim 1, wherein the at least one of the transmission devices is a first transmitting-end device, and the first transmitting-end device is coupled to the receiving-end device through wireless communication, and is coupled to a first audio-video providing device through wired communication,
   wherein when the first audio-video providing device executes a video conference software, a sound processing module of the first transmitting-end device receives at least one sound signal provided by other transmission device from the receiving-end device, and the sound processing module provides the at least one sound signal to the first audio-video providing device.

13. The multimedia system according to claim 12, wherein the at least another one of the transmission devices is a second transmitting-end device, and the second transmitting-end device is coupled to the receiving-end device through wireless communication, and is coupled to a second audio-video providing device through wired communication,
   wherein the second audio-video providing device provides the at least one sound signal to the second transmitting-end device, and the second transmitting-end device provides the at least one sound signal to the sound processing module of the first transmitting-end device through the receiving-end device.

14. The multimedia system according to claim 12, wherein a built-in microphone of the first audio-video providing device is not disabled.

15. The multimedia system according to claim 1, wherein when the receiving-end device executes a video conference software, the receiving-end device respectively registers the transmission devices as a plurality of virtual microphones, and the video conference software directly connects the virtual microphones.

16. The multimedia system according to claim 1, wherein the receiving-end device comprises a human-machine interface, and the receiving-end device controls the at least one of the transmission devices according to an authority setting of the human-machine interface, and normally enables the microphone of the at least one of the transmission devices.

* * * * *